United States Patent
Leung et al.

(10) Patent No.: US 12,505,066 B2
(45) Date of Patent: Dec. 23, 2025

(54) EXECUTION STATE MANAGEMENT

(71) Applicant: SambaNova Systems, Inc., Palo Alto, CA (US)

(72) Inventors: Kin Hing Leung, Cupertino, CA (US); Manish K. Shah, Austin, TX (US); Ram Sivaramakrishnan, San Jose, CA (US); Raghu Prabhakar, San Jose, CA (US)

(73) Assignee: SambaNova Systems, Inc., Palo Alto, CA (US)

(*) Notice: Subject to any disclaimer, the term of this patent is extended or adjusted under 35 U.S.C. 154(b) by 537 days.

(21) Appl. No.: 17/978,937

(22) Filed: Nov. 1, 2022

(65) Prior Publication Data

US 2023/0134744 A1  May 4, 2023

Related U.S. Application Data

(60) Provisional application No. 63/274,304, filed on Nov. 1, 2021.

(51) Int. Cl.
*G06F 15/173* (2006.01)
*G06F 15/78* (2006.01)

(52) U.S. Cl.
CPC .... *G06F 15/17325* (2013.01); *G06F 15/7871* (2013.01)

(58) Field of Classification Search
CPC ........... G06F 15/17325; G06F 15/7871; G06F 9/522; G06F 15/7867
See application file for complete search history.

(56) References Cited

U.S. PATENT DOCUMENTS

| | | | | |
|---|---|---|---|---|
| 7,490,218 | B2* | 2/2009 | Eggers | G06F 9/5038 712/25 |
| 10,698,853 | B1* | 6/2020 | Grohoski | G06F 13/4027 |
| 2021/0073170 | A1* | 3/2021 | Liao | G06F 15/7807 |
| 2021/0334134 | A1* | 10/2021 | Voitsechov | G06F 9/3004 |

* cited by examiner

*Primary Examiner* — Farley Abad
(74) *Attorney, Agent, or Firm* — Flagship Patents; Sikander M. Khan; Bruce A. Young

(57) ABSTRACT

A system includes a first coarse-grained reconfigurable (CGR) processor including first and second CGR arrays. A second CGR processor includes third and fourth CGR arrays. Each CGR array includes an address generator and coalescing unit (AGCU) designated as an array master AGCU (AMAGCU). The first CGR array AGCU is also designated as a processor master AGCU (PMAGCU) and as a system master (SMAGCU). The third CGR array AGCU is also designated as a PMAGCU. Each AMAGCU performs first execution synchronization actions, each PMAGCU also performs second execution synchronization actions, and the SMAGCU also performs third execution synchronization actions. The execution synchronization actions include a token exchange protocol for tokens such as "array ready", "processor ready", "system master ready", "program start", "array done", "processor done", and "program terminate". The tokens are communicated over a token bus via token interfaces that include a bus interface and a token receive FIFO.

15 Claims, 10 Drawing Sheets

1400

1410
Wait for the end of execution of a locally executed part of the computation graph program on each CGR array and send an "array done" token from the CGR array's AMAGCU to the SMAGCU 1420
In the SMAGCU, wait for receiving the "array done" tokens from all AMAGCUs 1430
Send the "program terminate" token from the SMAGCU to all AMAGCUs

FIG. 14

EXECUTION STATE MANAGEMENT

RELATED APPLICATIONS AND REFERENCES

This patent document incorporates the following documents by reference herein for all purposes.
- U.S. provisional patent application, Ser. No. 63/274,304, entitled "Execution State Management," filed Nov. 1, 2021, from which this application claims priority.
- U.S. Pat. No. 10,698,853, entitled "Virtualization of a Reconfigurable Data Processor," issued Jun. 30, 2020.
- U.S. Pat. No. 10,831,507, entitled "Configuration Load of a Reconfigurable Data Processor," issued Nov. 10, 2020.
- Prabhakar et al., "Plasticine: A Reconfigurable Architecture for Parallel Patterns," ISCA '17, Jun. 24-28, 2017, Toronto, ON, Canada;
- SambaNova whitepaper "Accelerated Computing with a Reconfigurable Dataflow Architecture", available on the sambanova.ai website.

BACKGROUND

Technical Field

The technology disclosed relates to synchronization of parallel processing architectures. In particular, it relates to synchronization of parallel processing meta-pipelines that execute computation graph and dataflow graph programs in multiple coarse-grained reconfigurable (CGR) processors.

SUMMARY

Particular aspects of the technology disclosed are described in the claims, specification and drawings.

Reconfigurable processors, including coarse-grained reconfigurable (CGR) processors, graphic processing units (GPUs), and field programmable gate arrays (FPGAs), can be configured to implement a variety of functions more efficiently or faster than might be achieved using a general-purpose processor executing a computer program. CGR processors are developed including one or more arrays of CGR units (CGR arrays). Such arrays are more complex than those used in typical, more fine-grained FPGAs, and may enable faster and more efficient execution of various classes of functions. CGR processors have been proposed that provide energy-efficient accelerators for complex dataflow graphs used in, for example, machine learning and artificial intelligence workloads.

In a first aspect, an implementation provides a CGR processor. It includes one or more physical CGR arrays. Each physical CGR array includes an array of CGR units, an address generator and coalescing unit (AGCU), and a token interface. The token interface includes a bus interface, a token receive first-in-first-out memory (a token receive FIFO) coupled between the bus interface and the AGCU, and a token transmit FIFO coupled between the AGCU and the bus interface. The token interface is configured to communicate with another token interface via a token bus; and it is operable to receive tokens from the token bus and store received tokens in its token receive FIFO independent of a readiness of the array of CGR units and a readiness of the AGCU. The AGCU is operable to: (1) load and unload configuration data into and out of the array of CGR units; (2) determine a configuration data load status and transmit a token including the configuration data load status via the token interface and the token bus; (3) receive a program start token, and in response to receiving the program start token, start program execution in the array of CGR units; and (4) receive a program termination token, and in response to receiving the program termination token, terminate program execution in the array of CGR units.

In a second aspect, an implementation provides a system with a first CGR processor that executes at least a first part of a computation graph in at least a first part of a logical CGR array. The logical CGR array is mapped to multiple physical CGR arrays. The first CGR processor includes one or more physical CGR arrays, each including an array of CGR units and an address generator and coalescing unit (AGCU). Each of the one or more physical CGR arrays is associated and coupled with a token interface.

The token interface includes a bus interface and a token receive first-in-first-out memory (FIFO) coupled between the bus interface and the array of CGR units. The token interface is configured to communicate with another token interface via a token bus. The token interface is operable to receive tokens and store received tokens in its token receive FIFO independent of a readiness of the associated CGR array, and the physical CGR array is configured to exchange data and tokens with another physical CGR array.

Each CGR array includes an AGCU designated as an array master AGCU (AMAGCU). A first CGR array AMAGCU (of the first CGR processor) is also designated as a first processor master AGCU (first PMAGCU) and as a system master AGCU (SMAGCU). The system may include a second CGR processor to execute a second part of the computation graph in a second part of the logical CGR array, wherein an AMAGCU of a second physical CGR array of the multiple physical CGR arrays, included in the second CGR processor, is designated second PMAGCU and configured to synchronize execution start and execution termination for physical CGR arrays in the logical CGR array that are included in the second CGR processor. The system may hierarchically synchronize execution start by:

In the first PMAGCU, receiving an "array ready" token from the second AMAGCU, and waiting for the second physical CGR array to be ready for execution.

From the PMAGCU, sending a "processor ready" token to the SMAGCU.

In the SMAGCU, receiving the "processor ready" token from the PMAGCU, receiving an "array ready" token from the first AMAGCU, and waiting for the first physical CGR array to be ready for execution.

From the SMAGCU, sending a "program start" token to the PMAGCU and the first AMAGCU.

The system may hierarchically synchronize execution termination by: in the PMAGCU, receiving an "array done" token from the second AMAGCU, and waiting for the second physical CGR array to be done with execution; from the PMAGCU, sending a "processor done" token to the SMAGCU; in the SMAGCU, receiving the "processor done" token from the PMAGCU, receiving an "array done" token from the first AMAGCU, and waiting for the first physical CGR array to be done with execution; and from the SMAGCU, sending a "program terminate" token to the PMAGCU and the first AMAGCU.

BRIEF DESCRIPTION OF THE DRAWINGS

FIG. 14 illustrates another example method to synchronize execution end in a system with multiple CGR processors.

Figure 1:
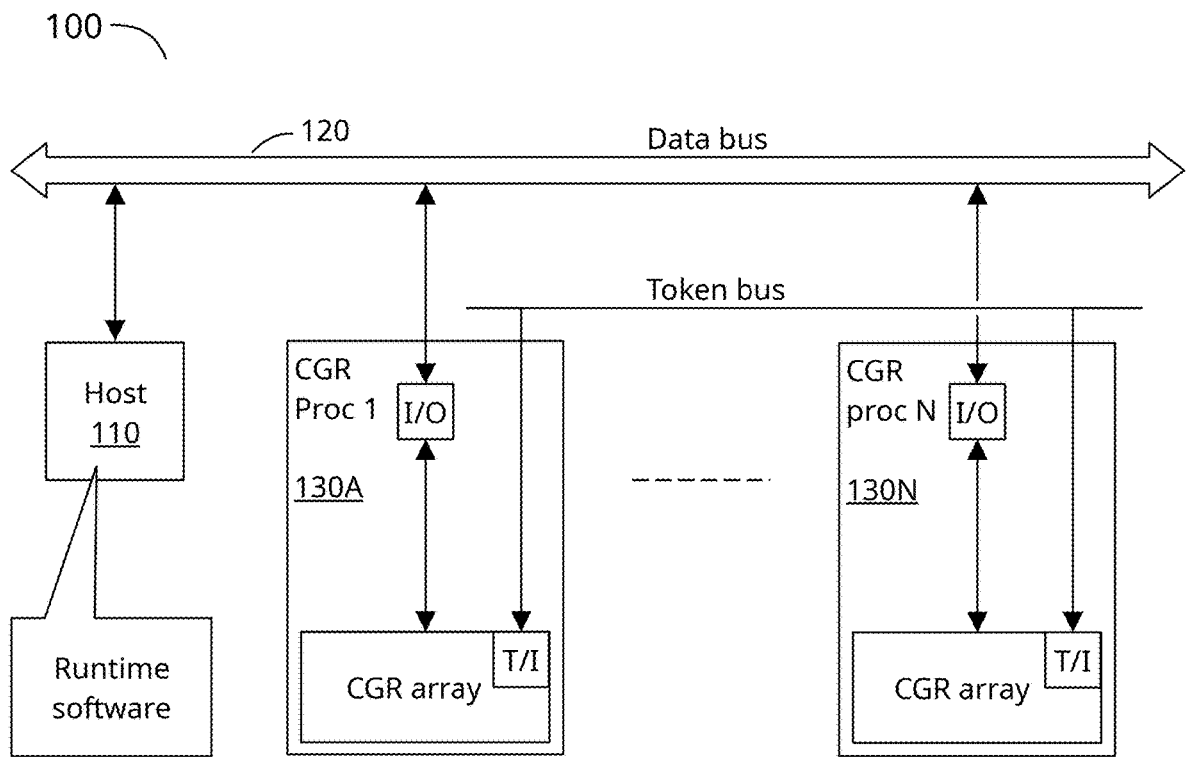
FIG. 1 illustrates an example system including a host, a data bus, a token bus, and two or more coarse-grained reconfigurable processors (CGR processors).

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

Reconfigurable processors, including coarse-grained reconfigurable (CGR) processors, graphic processing units (GPUs), and field programmable gate arrays (FPGAs), can be configured to implement a variety of functions more efficiently or faster than might be achieved using a general-purpose processor executing a computer program. CGR processors are developed including one or more arrays of CGR units (CGR arrays) that are more complex than those used in typical, more fine-grained FPGAs, and that may enable faster and more efficient execution of various classes of functions. CGR processors have been proposed that provide energy-efficient accelerators for complex dataflow graphs used in, for example, machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Configuration of CGR processors involves compilation of a high-level program comprising one or more dataflow graphs into configuration data for the CGR units in the CGR arrays, and distribution of the configuration data to the CGR processor. To start a process implemented using a dataflow graph, the configuration data must be loaded for that process. To change a process implementing a dataflow graph, the configuration data must be replaced.

A CGR array provides parallel processing of multiple interdependent but asynchronous meta-pipelines that may be included in a dataflow graph. The CGR array comprises an array-level network (ALN) of CGR units. Different CGR arrays may communicate with each other via a top-level network (TLN). The CGR units may include compute units and memory units. In some implementations, a single CGR array can concurrently run multiple dataflow graphs. In other implementations, a single dataflow graph may require multiple CGR arrays, or even multiple CGR processors.

A CGR processor, and each CGR array it incorporates, needs to get into an "EXECUTE" state to run the dataflow graph loaded on it. In a system with multiple CGR processors, each CGR processor may reach the EXECUTE state at a different time, since a program load operation may complete in any order among the CGR processors. When running a program that uses multiple CGR processors, each CGR processor needs to make sure that its peer CGR processors are available before initiating peer-to-peer (P2P) communication. Similarly, all CGR processors must have completed their activity before the program may be terminated.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).
AI—artificial intelligence.
ALN—array-level network.
CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.
CGRA—coarse-grained reconfigurable architecture. A data processor architecture that includes one or more arrays (CGR arrays) of CGR units.
Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU.

CU—coalescing unit.

Dataflow Graph—a computation graph that includes one or more loops that may be nested, and wherein nodes can send messages to nodes in earlier layers to control the dataflow between the layers.

FIFO—First-in, first-out memory. A serial memory that may store data of variable length, and in which data may be stored until the data has been read and is overwritten. Often, a FIFO has separate write and read ports and separate write and read strobe inputs. Data is read in the order in which it was written.

FCMU—fused compute and memory unit—a circuit that includes both a memory unit and a compute unit.

GPU—graphic processing unit

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

A logical CGR array or logical CGR unit—a CGR array or a CGR unit that is physically realizable, but that may not have been assigned to a physical CGR array or to a physical CGR unit a CGR array.

A logical CGR processor—a CGR processor that is physically feasible although it may be too large for a monolithic implementation, but that may not have been assigned to one or more physical CGR processors.

ML—machine learning.

PCU—pattern compute unit—a compute unit that can be configured to repetitively perform a sequence of operations.

PMU—pattern memory unit—a memory unit that can locally store data according to a programmed pattern.

Step—a method may include multiple steps. Some implementations execute the steps in the order described herein, and other implementations may execute the steps in a different order. Further implementations may execute additional steps.

TLN—top-level network.

WD—write data

Implementations

FIG. 1 illustrates an example system 100 including a host 110, a data bus 120, a token bus, and two or more coarse-grained reconfigurable processors (CGR processor 130A-N). Host 110 and each CGR processor 130 is coupled with data bus 120. In this example, each CGR processor 130 includes a CGR array with a token interface T/I to communicate with the token bus. The CGR array communicates with data bus 120 which may be part of the TLN. The TLN may include an input/output (I/O) interface to link information flow internal to CGR processor 130 to the external data bus 120. Some implementations may combine the token bus and data bus 120, but, for example, give token messages a different address than other messages. In other implementations the token bus and data bus 120 may be physically separate, as drawn. Data bus 120 may be, or include, any non-standard or standard data bus, such as PCIe.

Host 110 may execute various processes, for example compilation (prior to configuration of the CGR processors); loading, updating, and unloading configuration data; and runtime processes. Once execution of a high-level program starts, CGR processor 130A through CGR processor 130N communicate via the token bus to coordinate execution of any dataflow graphs that may occupy CGR arrays in different CGR processors in accordance with methods described herein.

A dataflow graph, for the purposes of this description, includes the configuration file compiled to execute a mission function procedure or set of procedures using the CGR processor(s), such as inferencing or learning in an artificial intelligence or machine learning system. A logical CGR array for the purposes of this description comprises a set of resources configured to support execution of an application graph in a CGR array, or multiple synchronized CGR arrays, in a manner that appears to the dataflow graph as if the resources were located in a single physical CGR array. The logical CGR array can be established as a part of the dataflow graph of the mission function that uses the logical CGR array, or it can be established using a separate configuration mechanism.

A CGR processor 130 can be implemented on a single CGRA integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding. In implementations, a CGR processor 130 may include one or more CGR arrays, each equipped with a token interface.

Figure 2:
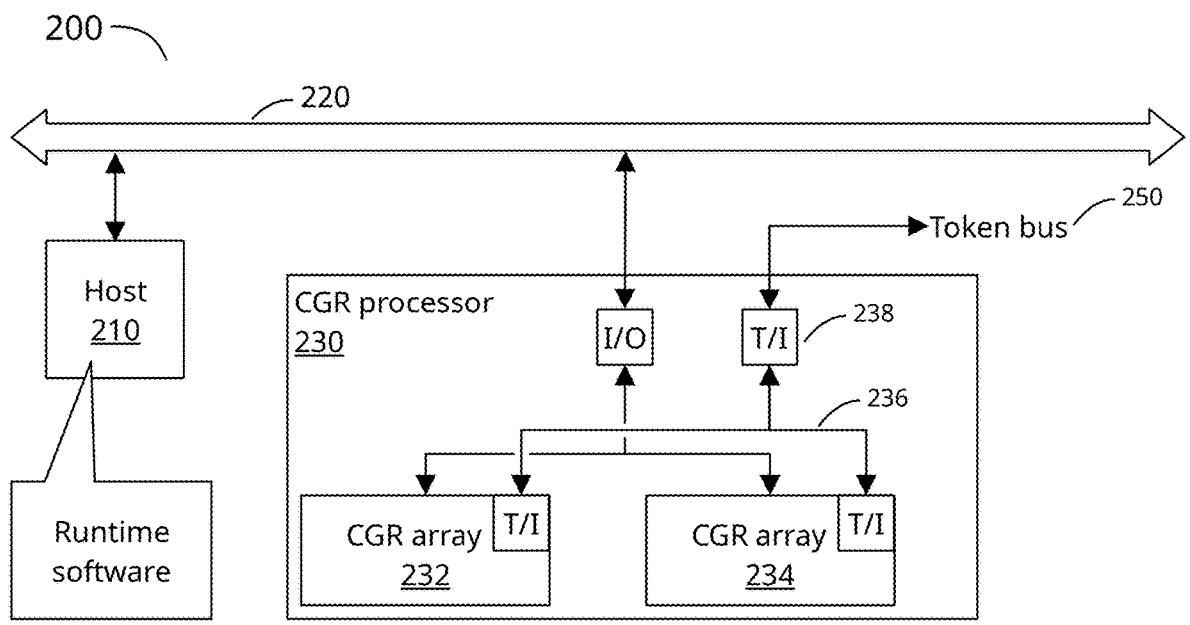
FIG. 2 illustrates an example system including a host, a databus, and a CGR processor that includes multiple CGR arrays.

FIG. 2 illustrates an example system 200 including a host 210, a databus 220, and a CGR processor 230 that includes multiple CGR arrays (CGR array 232 and CGR array 234 have been drawn). Host 210 and CGR processor 130 are coupled with data bus 120. Each CGR array is coupled with a TLN, which may include internal data channels, an I/O interface, and databus 220. Each CGR array includes a token interface T/I that may interface with processor-level token interface 238 via a processor-level token bus 236. Token interface 238 may further be coupled with a system-level token bus 250. System-level token bus 250 may be physically separate from databus 220, or it may be integrated with databus 220.

Figure 3:
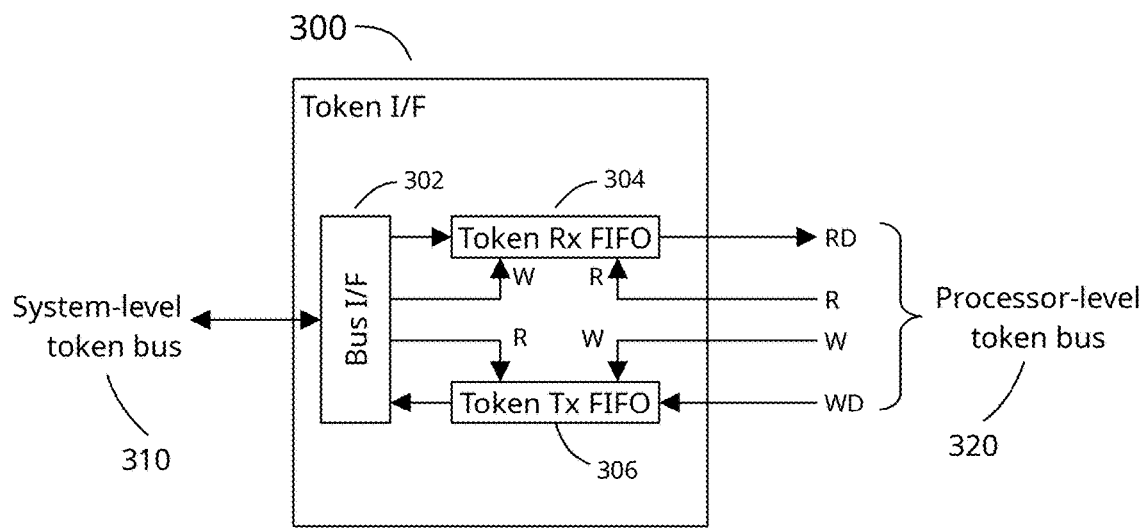
FIG. 3 illustrates an implementation of a token interface.

FIG. 3 illustrates an implementation of a token interface 300. Token interface 300 may interface system-level token bus 310 with processor-level token bus 320, or it may interface a processor-level token bus with an array-level token bus. Token interface 300 may comprise a bus interface 302, a token receive FIFO 304, and a token transmit FIFO 306. Bus interface 302 may control writing into token receive FIFO 304 and reading from token transmit FIFO 306, whereas processor-level token bus 320 (or the array-level token bus) may control reading from token receive FIFO 304 and writing into token transmit FIFO 306.

Bus interface 302 may comprise, for example, a PCIe PHY and controller. Token receive FIFO 304 has a data input coupled with a token output of bus interface 302 and a write clock input W coupled to a token write clock output of bus interface 302. It further has a data output coupled with a read data (RD) input of processor-level token bus 320, and a read clock input R coupled to a read clock output R of processor-level token bus 320. Token transmit FIFO 306 has a data input coupled with a write data (WD) output of processor-level token bus 320, a write clock input W coupled with a write clock output W of processor-level token bus 320, a data output coupled with a token input of bus interface 302, and a read clock input R coupled with a token read clock output of bus interface 302. Token interface 300 is configured to be available and operating from a time when CGR arrays are not available and operating yet, until after the CGR arrays have operated (e.g., executed a program) and have become idle. Thus, token interface 300 may receive tokens while the CGR array is unavailable, and store the received tokens in a first-in-first-out order in token receive FIFO 304. Once the CGR array is available and operational, it can collect the tokens in the received order by reading them from token receive FIFO 304. To transmit a token, the CGR array writes the token into token transmit FIFO 306, and bus interface 302 will collect it from token transmit FIFO 306 as soon as it is available to transmit.

Figure 4:
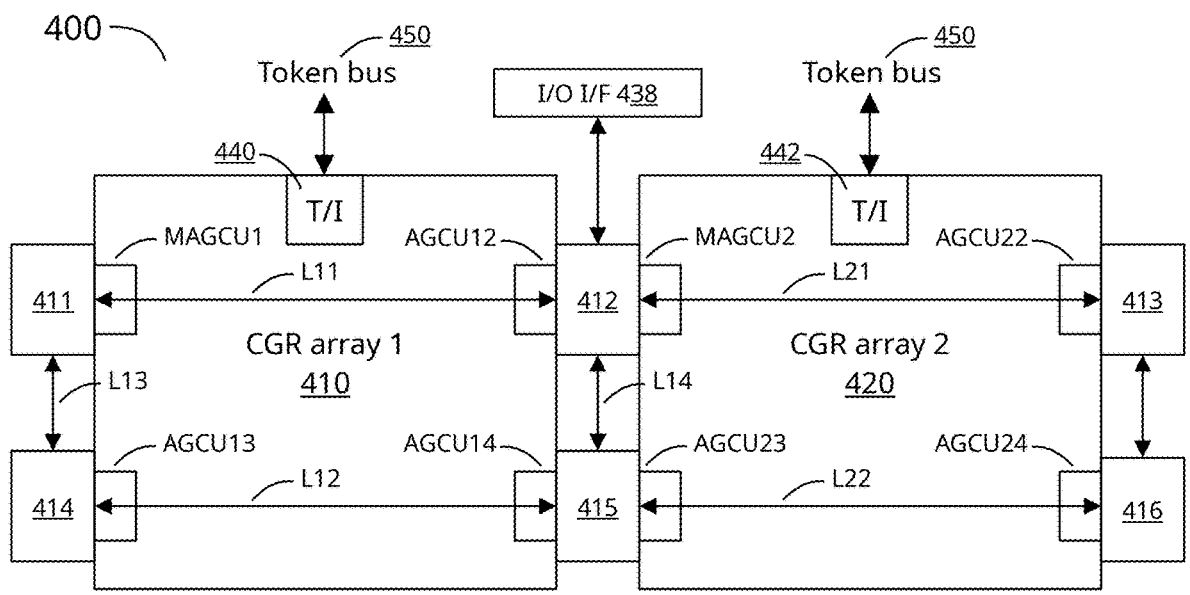
FIG. 4 illustrates details of an example CGR architecture that includes a top-level network, a token bus, and two CGR arrays.

FIG. 4 illustrates details of an example CGR architecture (CGRA 400) that includes a top-level network, a token bus 450, and two CGR arrays (CGR array 410 and CGR array 420). Other implementations may include fewer or more CGR arrays. A CGR array comprises an array of CGR units that are interconnected via an ALN. The architecture includes a TLN coupling the CGR arrays to external I/O interface 438 (or any number of interfaces). Other implementations may use different bus architectures. CGR units are networking nodes on the ALN.

In this example architecture, each CGR array has four AGCUs (e.g., MAGCU1, AGCU12, AGCU13, and AGCU14 in CGR array 410). The AGCUs are networking nodes on the TLN and also networking nodes on their respective ALNs. An AGCU includes circuits for routing data among networking nodes on the TLN and on their respective ALNs.

Networking nodes on the TLN in this example include one or more external I/O interfaces, including external I/O interface 438. The interfaces to external devices include circuits for routing data among networking nodes on the TLN and external devices, such as high-capacity memory, host processors, other CGR processors, GPUs, FPGA devices, and so on, that are coupled with the interfaces.

One of the AGCUs in a CGR array in this example is configured to be a master AGCU (MAGCU), which includes an array configuration load/unload controller for the tile. Other implementations may include more than one array configuration load/unload controller, and one array configuration load/unload controller may be implemented by logic distributed among more than one AGCU.

The MAGCU1 includes a configuration load/unload controller for CGR array 410, and MAGCU2 includes a configuration load/unload controller for CGR array 420. In other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone networking node on the TLN and the ALN.

The TLN is constructed using top-level switches (switch 411, switch 412, switch 413, switch 414, switch 415, and switch 416) coupled with each other as well as with other nodes on the TLN, including the AGCUs, and external I/O interface 438. The TLN includes links (e.g., L11, L12, L21, L22) connecting the top-level switches. Data may travel in packets between the top-level switches on the links, and from the switches to the CGR units and vice versa. For example, switch 411 and switch 412 are coupled by a link L11, switch 414 and switch 415 are coupled by a link L12, switch 411 and switch 414 are coupled by a link L13, and switch 412 and switch 413 are coupled by a link L21. The links can include one or more buses and supporting control lines, including for example a chunk-wide bus (vector bus). For example, the TLN can include data, request and response channels operable in coordination for transfer of data in a manner analogous to an AXI compatible protocol. See, AMBA AXI and ACE Protocol Specification, A R M, 2017.

Top-level switches can be coupled with AGCUs. For example, switch 411, switch 412, switch 414 and switch 415 are coupled with MAGCU1, AGCU12, AGCU13 and AGCU14 in CGR array 410, respectively. Switch 412, switch 413, switch 415 and switch 416 are coupled with MAGCU2, AGCU22, AGCU23 and AGCU24 in CGR array 420, respectively. Top-level switches can be coupled with one or more external I/O interfaces (e.g., external I/O interface 438).

Figure 5:
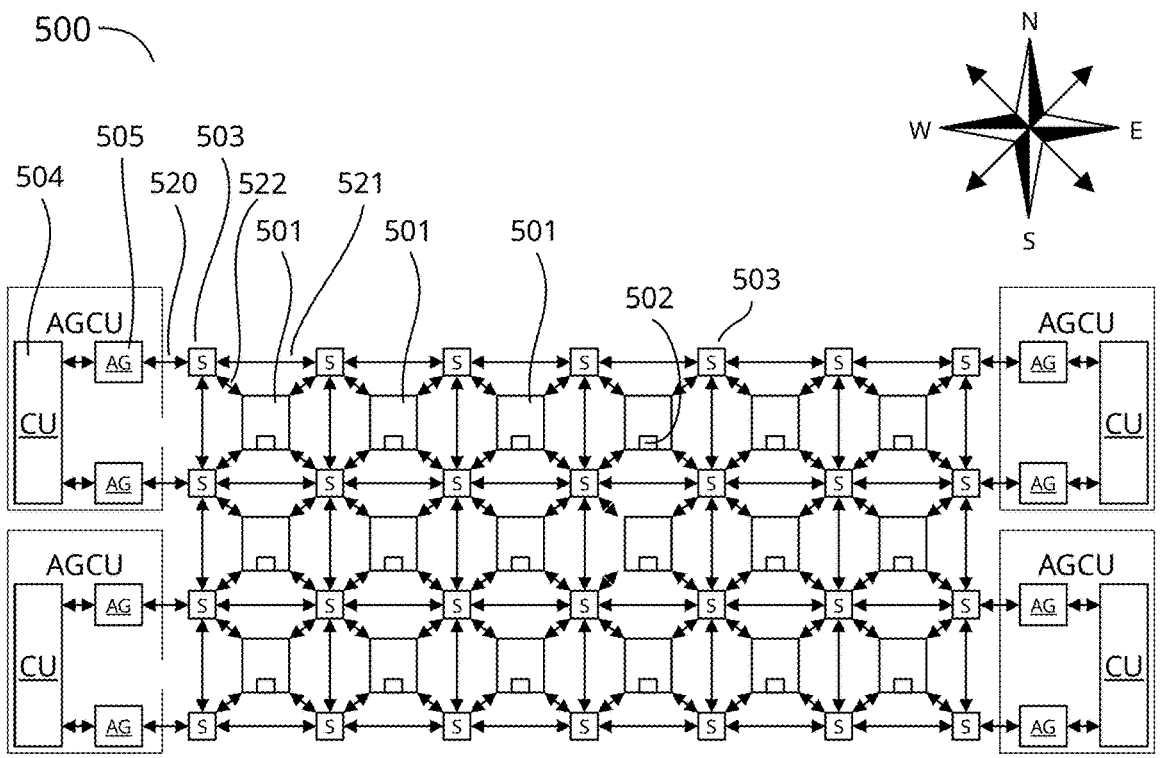
FIG. 5 illustrates an example CGR array, including an array of CGR units in an array-level network (ALN).

FIG. 5 illustrates an example CGR array 500, including an array of CGR units in an ALN. CGR array 500 may include several types of CGR unit 501, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada. Each of the CGR units may include a configuration store 502 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 501 comprises an FCMU. In other implementations, the array comprises both PMUs and PCUs, or memory units and compute units, arranged in a checkerboard pattern. In yet other implementations, CGR units may be arranged in different patterns. The ALN includes switch units 503(S), and AGCUs (each including two address generators (AG 505) and a shared coalescing unit (CU 504)). Switch units 503 are connected among themselves via interconnects 521 and to a CGR unit 501 with interconnects 522. Switch units 503 may be coupled with an AG 505 via interconnects 520. In some implementations, communication channels can be configured as end-to-end connections, and switch units 503 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 521 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 501 may have four ports (as drawn) to interface with switch units 503, or any other number of ports suitable for an ALN. Each port may be suitable for receiving and transmitting data, or a port may be suitable for only receiving or only transmitting data.

A switch unit, as shown in the example of FIG. 5, may have eight interfaces. The North, South, East and West interfaces of a switch unit may be used for links between switch units using interconnects 521. The Northeast, Southeast, Northwest and Southwest interfaces of a switch unit may each be used to make a link with an FCMU, PCU or PMU instance using one of the interconnects 522. Two switch units in each CGR array quadrant have links to an AGCU using interconnects 520. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 500, and any number of other CGR arrays coupled with CGR array 500.

A data processing operation implemented by CGR array configuration may comprise multiple graphs or subgraphs specifying dataflow operations that are distributed among and executed by corresponding CGR units (e.g., FCMUs, PMUs, PCUs, AGs, and CUs).

Figure 6:
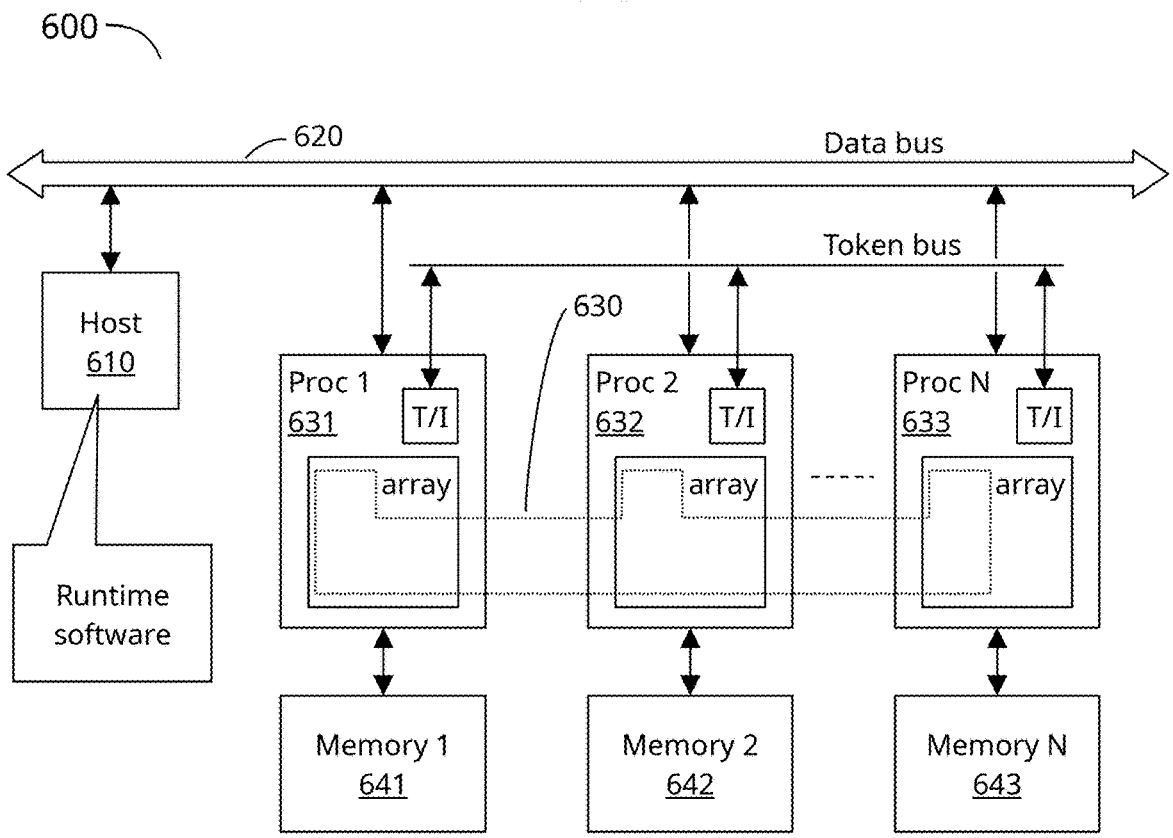
FIG. 6 illustrates an implementation of a system with a logical CGR array spanning multiple CGR processor devices.

FIG. 6 illustrates an implementation of a system 600 with a logical CGR array spanning multiple CGR processor devices. System 600 includes host 610 which is coupled with CGR processor 631, CGR processor 632 and CGR processor 633 via one or more buses 620. Each CGR processor may be coupled with a memory, for example, logical CGR array 630 may be coupled with memory 641, CGR processor 632 may be coupled with memory 642, and CGR processor 633 may be coupled with memory 643. System 600 may include any number of CGR processors (3 have been drawn) and memories (3 have been drawn). The CGR processors can each be implemented on a single IC. The CGR processors can include a CGR array like the one discussed above in reference to FIG. 5 and other figures, or any other type of array of configurable units. Each CGR processor is associated and coupled with a token interface T/I.

In some implementations, host 610 can communicate with a memory, e.g., memory 641 to memory 643, via a TLN in the intervening CGR processor.

A logical CGR array 630, as opposed to a physical CGR array, is configured to act as a single machine for execution of a single program (or dataflow graph). Logical CGR array 630 spans multiple physical CGR arras, for instance in the example shown, the CGR arrays in CGR processor 631, CGR processor 632, and CGR processor 633. Whereas an implementation may obtain a logical CGR array by compiling a source program, for example in PyTorch or TensorFlow, the implementation may partition the logical CGR array over the physical CGR arrays at runtime. At the time of partitioning the logical CGR array, a runtime daemon may add a few lines of software code to an application graph running in each physical CGR array to support a program synchronization protocol as detailed with reference to later figures. An implementation may designate one physical CGR array as a system master CGR array. The local program synchronization code in the system master CGR array may support a system master side of the synchronization protocol, whereas the other physical CGR arrays include local program synchronization code that may support a client side of the synchronization protocol. For resource utilization optimization, the runtime daemon may not apply a strict partitioning, e.g., a small part of software assigned to a first physical CGR array may actually run on a second physical CGR array. For the purpose of this document, we will refer to this as overflow partitioning.

Figure 7:
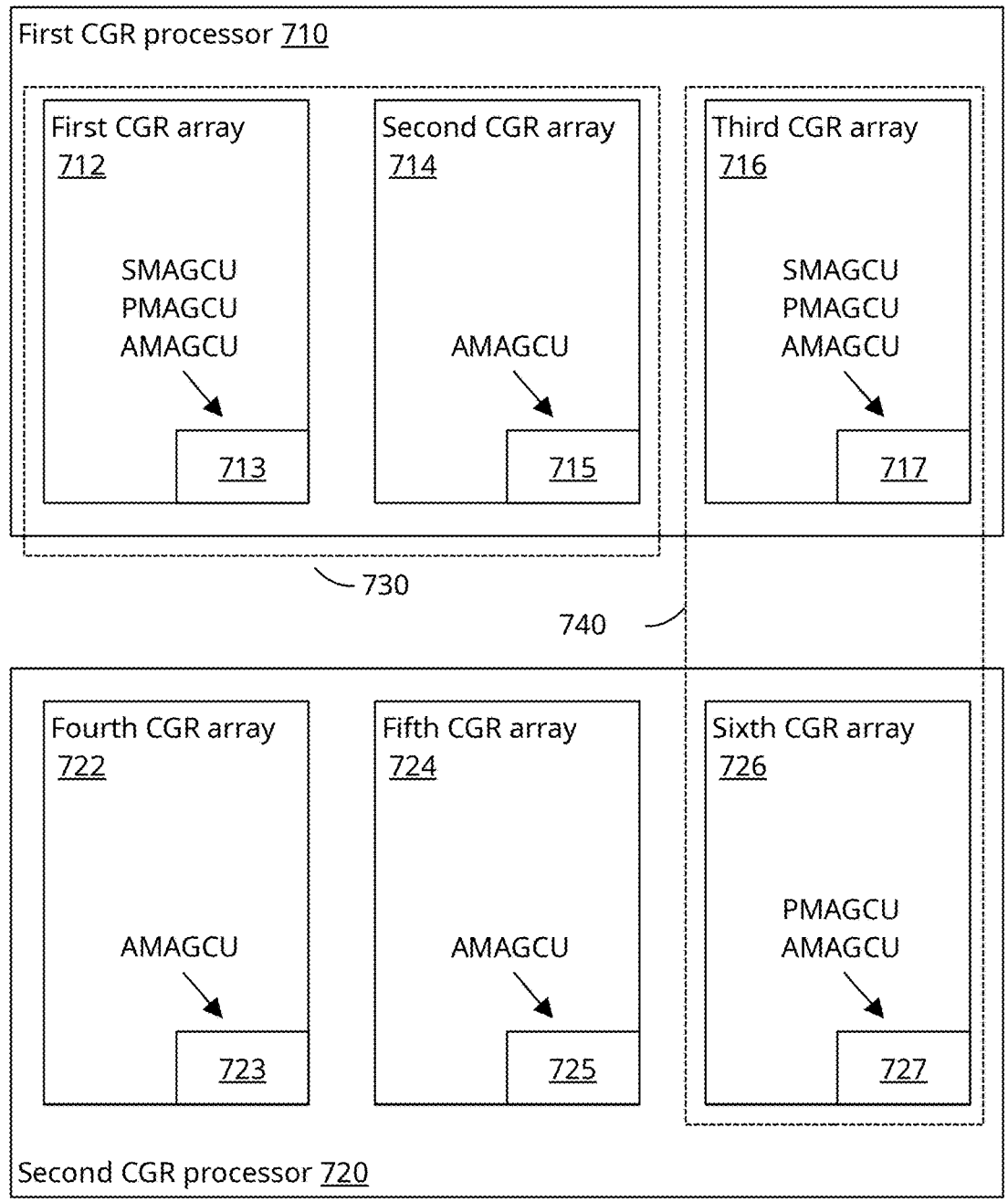
FIG. 7 illustrates an example system with multiple CGR processors, a first logical CGR array that maps to multiple physical CGR arrays within a single CGR processor and a second logical CGR array that maps to multiple physical CGR arrays in several CGR processors.

FIG. 7 illustrates an example system 700 with multiple CGR processors, a first logical CGR array 730 that maps to multiple physical CGR arrays within a single CGR processor and a second logical CGR array 740 that maps to multiple physical CGR arrays in several CGR processors. The first logical CGR array 730 is designated to execute a first dataflow graph, and the second logical CGR array 740 is designated to execute a second dataflow graph. The two dataflow graphs may be unrelated to each other. In this example, synchronization is required only within each dataflow graph, and therefore their synchronization may be managed separately. However, they can be managed with the simple protocol that is described with reference to FIGS. 8-9. Another system will be described with reference to FIG.

10, that requires synchronize of a logical CGR array mapped to multiple physical CGR arrays each in multiple CGR processors. That system requires a hierarchical protocol presented in FIGS. 11-12.

System 700 includes a first CGR processor 710 and a second CGR processor 720. First CGR processor 710 includes first physical CGR array 712 with first AGCU 713, second physical CGR array 714 with second AGCU 715, and third physical CGR array 716 with third AGCU 717. Second CGR processor 720 includes fourth physical CGR array 722 with fourth AGCU 723, fifth physical CGR array 724 with fifth AGCU 725, and sixth physical CGR array 726 with sixth AGCU 727. First logical CGR array 730 is mapped to first physical CGR array 712 and second physical CGR array 714. Second logical CGR array 740 is mapped to third physical CGR array 716 and sixth physical CGR array 726. The fourth physical CGR array 722 and fifth physical CGR array 724 are unused, i.e., not included in any logical CGR array. Since first logical CGR array 730 and second logical CGR array 740 are mapped to different physical CGR arrays, computation graph or dataflow graph programs contained in first logical CGR array 730 and second logical CGR array 740 may be executed simultaneously, although their execution may not need to be mutually synchronized.

Since each first logical CGR array 730 and second logical CGR array 740 map to multiple physical CGR arrays, both require synchronization of execution of their respective dataflow graphs, because each dataflow graph can include multiple meta-pipelines with variable execution times that may nevertheless interact at various points along the meta-pipelines. As long as the first and the second dataflow graphs have no interaction with each other, their synchronization management can remain independent. Synchronization management is performed by the AGCUs in the system. Each physical CGR array may include multiple AGCUs, but only one of those is designated array master AGCU (AMAGCU). Within a physical CGR array, synchronization is managed by the AMAGCU. A logical CGR array may map to physical CGR arrays of multiple CGR processors (such as is the case for second logical CGR array 740). Synchronization in each of the CGR processors to which a logical CGR array is mapped is managed by a processor master AGCU (PMAGCU), which is also an AMAGCU. Since first CGR processor 710 takes part in both first logical CGR array 730 and second logical CGR array 740, it is possible that first CGR processor 710 includes two PMAGCUs (in this example, first AGCU 713 and third AGCU 717). Second CGR processor 720 only takes part in second logical CGR array 740, so it also has a PMAGCU (sixth physical CGR array 726). Within a logical CGR array, synchronization is managed by a system master AGCU (SMAGCU), which is also a PMAGCU. Therefore, first logical CGR array 730 has its synchronization managed by first AGCU 713, and second logical CGR array 740 has its synchronization managed by third AGCU 717.

Figure 8:
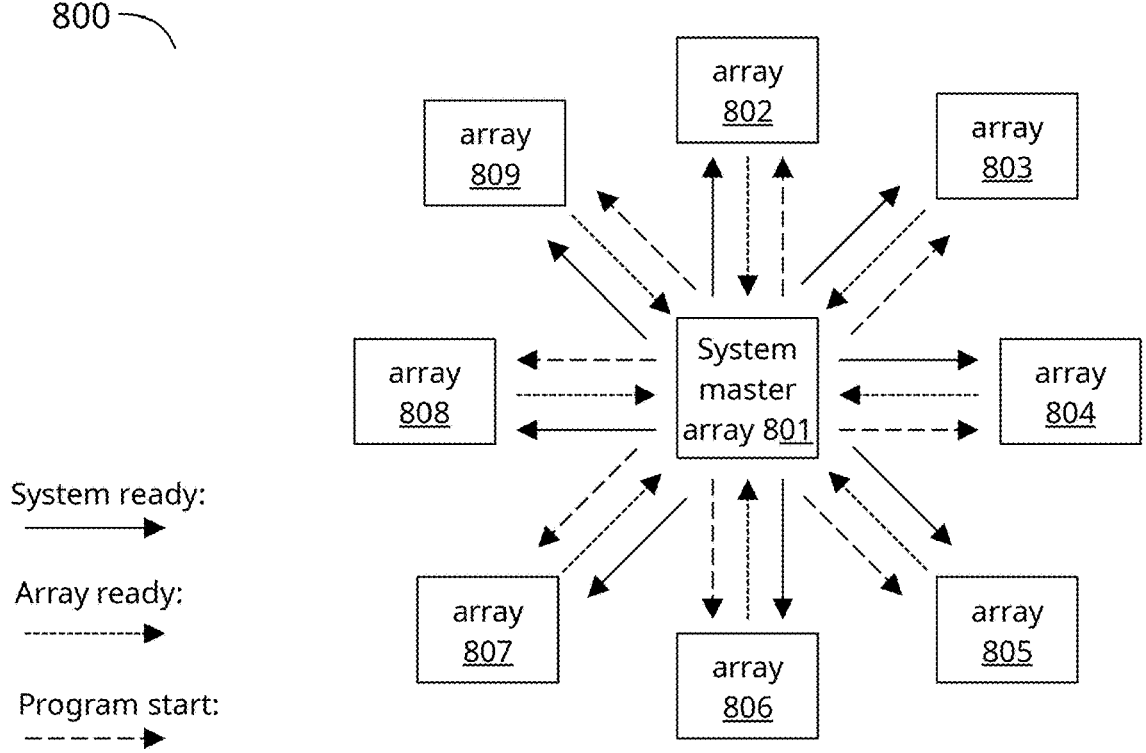
FIG. 8 illustrates a method to synchronize execution start of a dataflow graph that requires a system with multiple physical CGR arrays mapped to a single logical CGR array.
Figure 9:
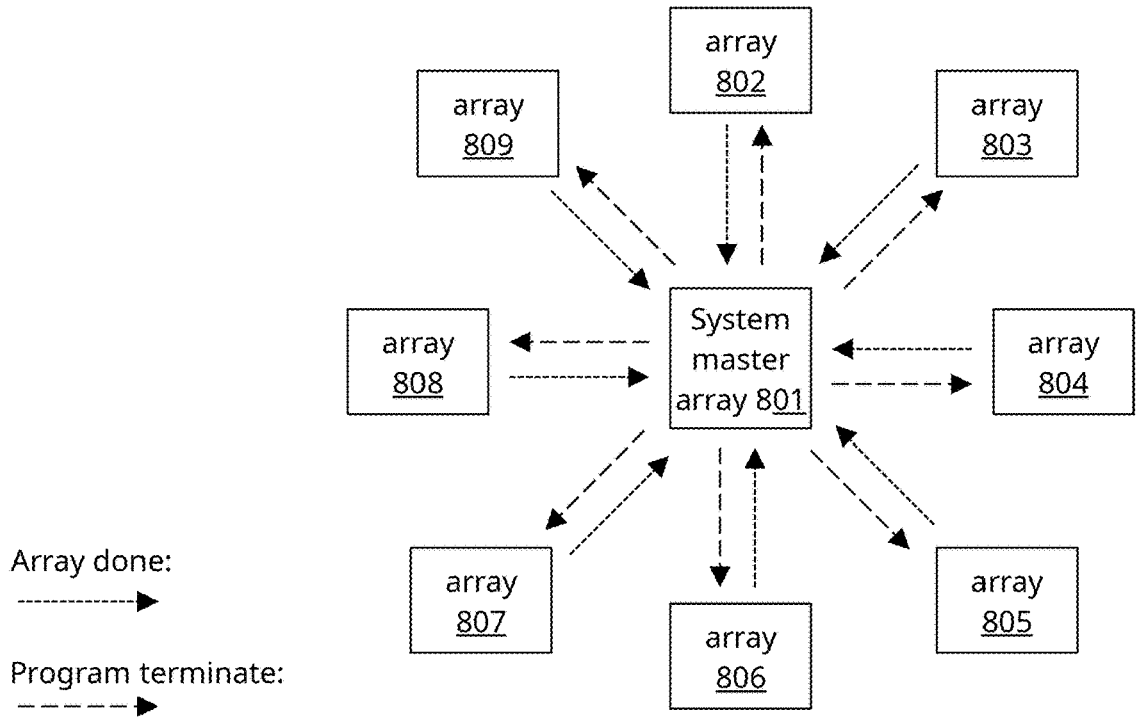
FIG. 9 illustrates an example method to synchronize execution termination of a dataflow graph that requires a system with multiple physical CGR arrays mapped to a single logical CGR array.

To manage synchronization, each SMAGCU, PMAGCU, and AMAGCU follows protocol steps such as illustrated by FIGS. 8 and 9. The protocol steps may be implemented in software, firmware, and/or hardware. Each SMAGCU may perform protocol steps also performed by a PMAGCU. Each PMAGCU may perform protocol steps also performed by an AMAGCU. In an implementation, each AMAGCU runs a first execution synchronization code, each PMAGCU also runs a second execution synchronization code, and the SMAGCU also runs a third execution synchronization code. Jointly, the first, second, and third execution synchronization code implement a synchronization protocol. The synchronization protocol may include, for example, an execution start synchronization protocol, and/or an execution termination synchronization protocol. In implementations different than depicted in FIG. 7, a PMAGCU may not need to be an AMAGCU, and an SMAGCU may not need to be a PMAGCU. In such implementations, an SMAGCU, PMAGCU, and AMAGCU may each run independent synchronization codes. However, the independent synchronization codes still jointly implement a synchronization protocol.

The logical CGR arrays shown in the example FIG. 7 are special. First logical CGR array 730 maps to physical CGR arrays that are all located in the same CGR processor, and thus in some implementations the PMAGCU can take care of the top-level synchronization without requiring separate SMAGCU functionality. Alternatively, the SMAGCU can take care of the top-level synchronization without requiring separate PMAGCU functionality. Second logical CGR array 740 maps to physical CGR arrays that are all located on different CGR processors (i.e., each CGR processor has only one physical CGR array in the logical CGR array), and thus in some implementations the SMAGCU can take care of the top-level synchronization without requiring separate PMAGCU functionality. For the purposes of this patent document, it is assumed that the SMAGCU takes care of synchronization management following a single protocol that includes both an execution start synchronization protocol and an execution termination protocol, as described with reference to FIGS. 8-9, for the two situations exemplified in first logical CGR array 730 and second logical CGR array 740. Where in the protocol the system master array sends out a token to all other arrays, this can be implemented in two different ways. In a first implementation, the system master array's SMAGCU broadcasts the token to all other AMAGCUs in the system, which all manage their individual physical CGR arrays. In a second implementation, the system master array's SMAGCU sends the token to part or all of the AGCUs, including AMAGCUs, via one or more serial transmissions. In this implementation, the token may travel from AGCU to AGCU in a daisy-chain style. This implementation may save hardware circuits, but it may also be slower than other implementations.

FIG. 8 illustrates a method to synchronize execution start of a dataflow graph that requires a system 800 with multiple physical CGR arrays mapped to a single logical CGR array. The method can be used in a single CGR processor that has multiple physical CGR arrays mapped to the logical CGR array, or in multiple CGR processors that each include a single physical CGR array mapped to the logical CGR array. This example implementation shows nine physical CGR arrays that jointly implement the single logical CGR array, including system master physical CGR array 801 (a physical CGR array with an AGCU designated as SMAGCU) and physical CGR array 802 through physical CGR array 809, each including an AMAGCU. Each physical CGR array has a token interface (such as the token interfaces in system 200). System master physical CGR array 801 controls synchronization. To determine the start of synchronized execution, system master physical CGR array 801 sends, from its token interface, a first token "system ready" to physical CGR array 802 through physical CGR array 809. Each of these physical CGR arrays receives the first token "system ready" on its token interface, which remembers the first token until the physical CGR array is ready, upon which it responds by sending a second token "array ready" to system master physical CGR array 801. If the physical CGR array was ready before system master physical CGR array 801 was ready, the physical CGR array may respond to the first token immediately by sending the second token to system master physical CGR array 801. System master physical CGR array 801 registers the response from each physical CGR array, for example by counting the received "array ready" tokens or by setting a flag for each received response. When all other physical CGR arrays that are mapped to the logical CGR array have responded, system master physical CGR array 801 sends a third token "program start" to physical CGR array 802 through physical CGR array 809, upon which system master physical CGR array 801 and physical CGR array 802 through physical CGR array 809 all start executing the program(s) included in the logical CGR array.

In some implementations, the method starts with system master physical CGR array 801 sending out the "system ready" token, and physical CGR array 802 through physical CGR array 809 respond with the "array ready" tokens. In other implementations, the method starts with physical CGR array 802 through physical CGR array 809 sending out individual "array ready" tokens when they're ready, and once system master physical CGR array 801 has received all "array ready" tokens and it also is ready itself, it sends out the "system ready" token.

The system master physical CGR array 801 and physical CGR array 802 through physical CGR array 809 may all have identical hardware. Thus, system master physical CGR array 801 is no different than physical CGR array 802 through physical CGR array 809. In implementations, a compiler may compile a computation graph or dataflow graph program to define processing tasks in a logical CGR array for it. A second program, such as a runtime daemon executing on a host computer, may configure the logical CGR array across multiple physical CGR arrays, and designate one of the peer physical CGR arrays as system master CGR array by configuring its AGCU with configuration data that causes it to perform a first part of a synchronization protocol, while configuring other AGCUs with configuration data that causes them to perform a second part of the synchronization protocol.

After the program start, all CGR arrays including system master physical CGR array 801 may act as peers, jointly executing the program(s) on the one or more logical CGR arrays. The physical CGR arrays may communicate peer-to-peer to move data when and where needed.

FIG. 9 illustrates a method to synchronize execution termination of a dataflow graph that requires a system with multiple physical CGR arrays mapped to a single logical CGR array. The method uses two additional tokens: a fourth token "array done" and a fifth token "program terminate". When a physical CGR array is done, i.e., when it has finished a final task that is its part of the computation graph or dataflow graph, the CGR array transitions to an idle state and sends a fourth token "array done" to system master physical CGR array 801. System master physical CGR array 801 registers the fourth tokens received from the other physical CGR arrays mapped to the logical CGR array, for example by counting the received "array ready" tokens or by setting a flag for each received "array done" token. When all physical CGR arrays mapped to the logical CGR array have finished their final tasks, system master physical CGR array 801 sends the fifth token "program terminate" to all other arrays mapped to the logical CGR array, and the physical CGR arrays mapped to the logical CGR array may be freed up. This last step supports overflow partitioning, in which a CGR array may perceive to be finished with execution of its code, whereas a small part of its hardware may still be active running a small part of a computation graph assigned to a different logical CGR array.

Figure 10:
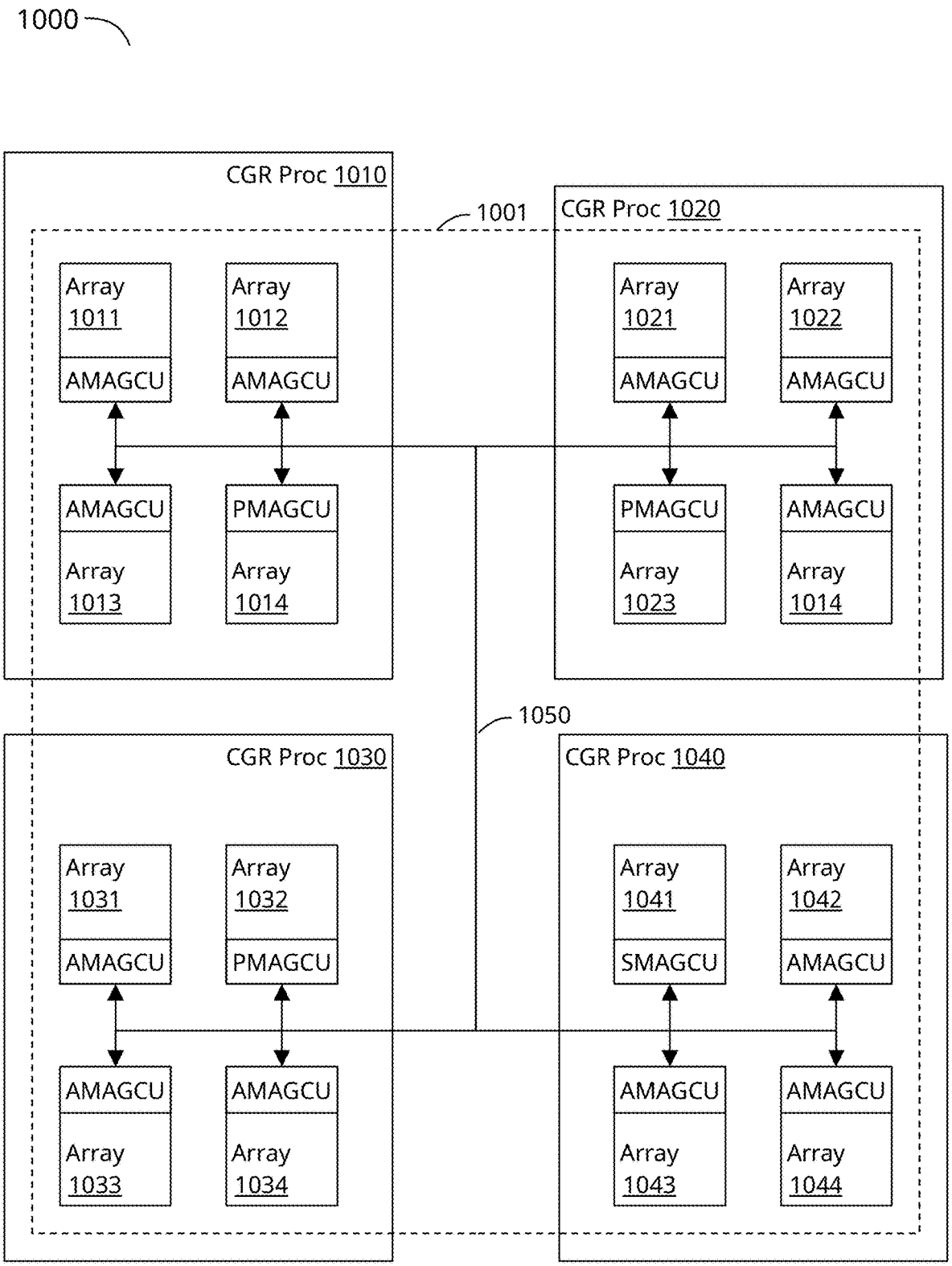
FIG. 10 shows an example system with multiple CGR processors, wherein each CGR processor has multiple CGR arrays.

FIG. 10 shows an example system 1000 with multiple CGR processors, wherein each CGR processor has multiple CGR arrays. The example CGR processors each have 4 CGR arrays. System 1000 includes CGR processor 1010, CGR processor 1020, CGR processor 1030, and CGR processor 1040. The four CGR processors, and all CGR arrays in them, are jointly mapped to a logical CGR array 1001 that includes a dataflow graph program to be executed. CGR processor 1010 includes CGR array 1011, CGR array 1012, CGR array 1013, and CGR array 1014. Each CGR array has one AMAGCU. The AMAGCU of CGR array 1014 also functions as PMAGCU. CGR processor 1020 includes CGR array 1021, CGR array 1022, CGR array 1023, and CGR array 1024. The AMAGCU of CGR array 1023 also functions as PMAGCU. CGR processor 1030 includes CGR array 1031, CGR array 1032, CGR array 1033, and CGR array 1034. The AMAGCU of CGR array 1032 also functions as PMAGCU. CGR processor 1040 includes CGR array 1041, CGR array 1042, CGR array 1043, and CGR array 1044. The AMAGCU of CGR array 1041 also functions as PMAGCU and SMAGCU.

Each of the AGCUs is connected with token bus 1050. System 1000 is capable of executing large programs, for instance computation graphs or dataflow graphs that require the joint capabilities of 16 physical CGR arrays. To ensure that different meta-pipelines that may each run asynchronously in logical CGR array 1001 can execute and interact with each other in a synchronized manner, program execution in all arrays must start simultaneously. The SMAGCU controls the protocol described with respect to FIG. 11 to ensure that the meta-pipelines all start execution simultaneously. When different meta-pipelines end, they each use the protocol described with respect to FIG. 13 to inform the SMAGCU that they are done, and when all processes have ended, the SMAGCU can stop the program and release the hardware for other tasks.

Figure 11:
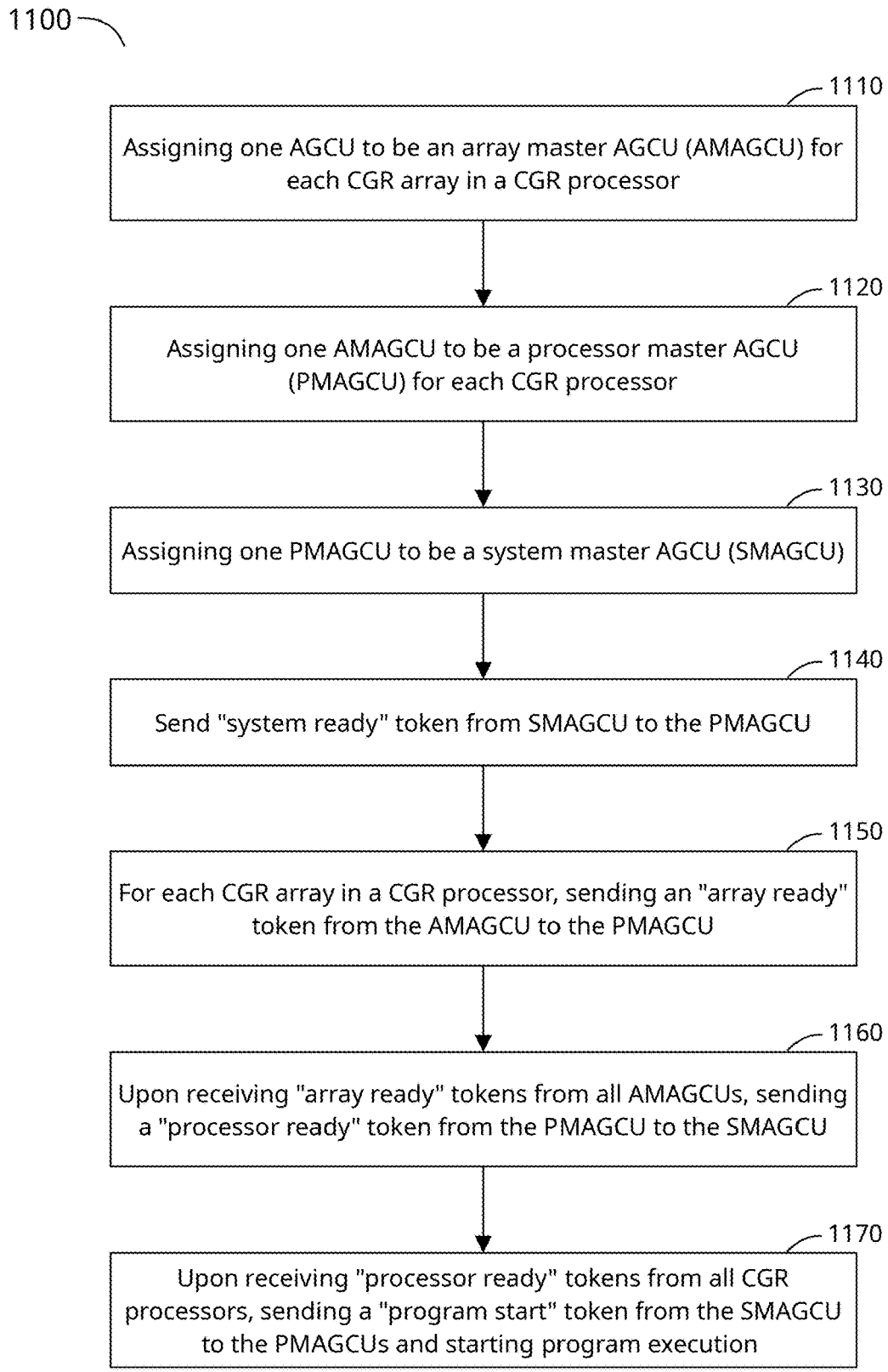
FIG. 11 illustrates an example method to hierarchically synchronize execution start in a system with multiple CGR processors.

FIG. 11 illustrates an example method 1100 to hierarchically synchronize execution start in a system with multiple CGR processors. The system may be similar to system 1000. Each CGR processor may include multiple CGR arrays. Each CGR array may include multiple AGCUs. For example, the system may execute a dataflow graph program in a logical CGR array that is mapped to a first processor with a first physical CGR array (with an SMAGCU) and a second physical CGR array (with a second AMAGCU), and a second processor with a third physical CGR array (with a PMAGCU) and a fourth physical CGR array (with a fourth AMAGCU). For the execution of the dataflow graph program, the implementation first determines the logical CGR array, and then maps the logical CGR array to at least a part of the CGR processors (the used CGR processors) and in the used CGR processors to at least a part of the physical CGR arrays (the used physical CGR arrays). In other words, the implementation configures the used physical CGR arrays to execute the functionality of the logical CGR array.

Using a synchronization protocol that includes an execution start synchronization protocol and an execution termination synchronization protocol, method 1100 synchronizes execution start of the dataflow graph program in the used physical CGR arrays. Method 1100 includes the following steps.

Step 1110—assigning one AGCU to be an array master AGCU (AMAGCU) for each used physical CGR array in each used CGR processor. The implementation configures each assigned AMAGCU with configuration data that causes the AGCU to act as an AMAGCU and to run first execution start synchronization code.

Step 1120—assigning one AMAGCU to be a processor master AGCU (PMAGCU) for each used CGR processor. The implementation configures each assigned PMAGCU with configuration data that causes the AGCU to act as a PMAGCU and to run second execution synchronization code.

Step 1130—assigning one PMAGCU to be a system master AGCU (SMAGCU). The implementation configures the assigned SMAGCU with configuration data that causes the AGCU to act as the SMAGCU and to run third execution synchronization code.

Step 1140—sending a "system ready" token from the SMAGCU to each PMAGCU. In some implementations, the SMAGCU does not need to send a "system ready" token to itself.

Step 1150—for a used physical CGR array in a used CGR processor, sending an "array ready" token from its AMAGCU to its PMAGCU. In some implementations, a PMAGCU does not need to send an "array ready" token to itself as long as it monitors its own array for readiness.

From a different perspective, Step 1150 comprises waiting, in the PMAGCU, for the third physical CGR array to be ready for execution, and for receiving an "array ready" token from the fourth AMAGCU.

Step 1160—upon receiving the "system ready" token and "array ready" tokens from all AMAGCUs in a used CGR processor, sending a "processor ready" token from its PMAGCU to the SMAGCU. Step 1160 may involve each CGR processor that is configured to execute part of the dataflow program. However, the SMAGCU does not need to send a "processor ready" token to itself as long as it monitors its own arrays for readiness. The PMAGCU may determine if all "array ready" tokens have been received by counting the "array ready" tokens, or by any method with similar result.

From a different perspective, Step 1160 comprises receiving, in the SMAGCU, the "processor ready" token from the PMAGCU, receiving an "array ready" token from the second AMAGCU, and waiting for the first physical CGR array to be ready for execution.

Step 1170—upon receiving "processor ready" tokens from used CGR processors other than the CGR processor with the SMAGCU, and receiving the "array ready" tokens from used physical CGR arrays in the CGR processor with the SMAGCU other than the used physical CGR array with the SMAGCU, sending a "program start" token from the SMAGCU to the PMAGCUs and starting execution of the dataflow program. The SMAGCU may determine if all "processor ready" tokens have been received by counting the "processor ready" tokens, or by any method with similar result.

Figure 12:
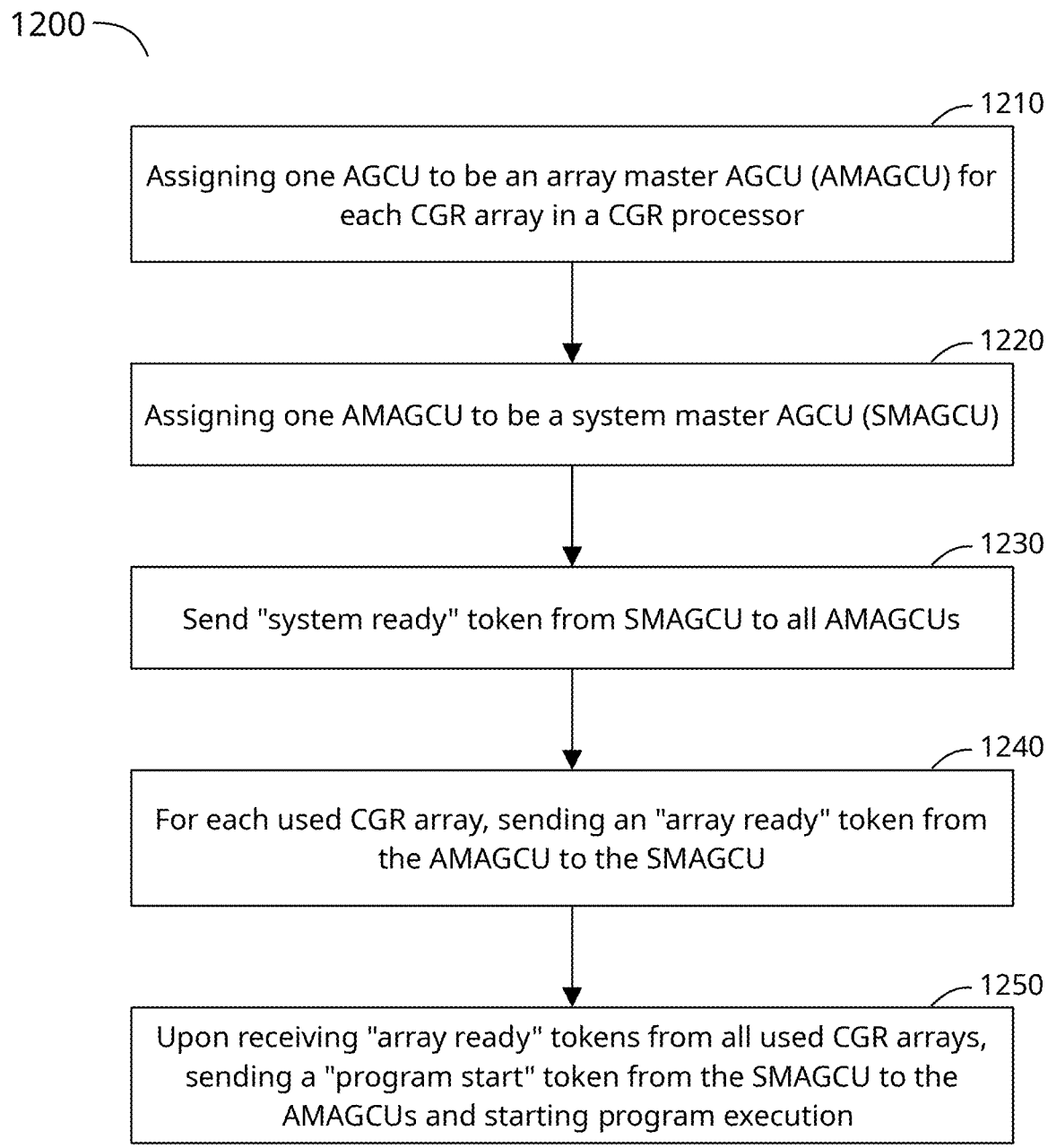
FIG. 12 illustrates another example method to synchronize execution start in a system with multiple CGR processors.

FIG. 12 illustrates another example method 1200 to synchronize execution start in a system with multiple CGR processors. This method does not assign a PMAGCU for each processor, but directly communicates between the SMAGCU and the AMAGCUs. The SMAGCU may broadcast its tokens, i.e., send them simultaneously to all AMAGCUs, or it may send the tokens via one or more serial transmissions. In such an implementation, the tokens may travel from AGCU to AGCU in a daisy-chain style. The implementation may save hardware circuits, but it may also be slower than other implementations. Method 1200 comprises:

Step 1210—for each physical CGR array mapped to a logical CGR array, configuring one AGCU with configuration data that causes the AGCU to act as an AMAGCU and to execute a first part of an execution start synchronization protocol.

Step 1220—configuring one AGCU that is mapped to the logical CGR array with configuration data that causes the AGCU to act as an AMAGCU and to execute a second part of the execution start synchronization protocol.

Step 1230—sending a "system ready" token from the SMAGCU to all AMAGCUs. In some implementations, the SMAGCU broadcasts the "system ready" token, in other implementations it sends the "system ready" token via one or more serial transmissions.

Step 1240—for each physical CGR array that is mapped to the logical CGR array, sending an "array ready" token from its AMAGCU to the SMAGCU.

Step 1250—upon receiving the "array ready" tokens from all AMAGCUs, sending a "program start" token from the SMAGCU to the AMAGCUs and starting program execution. In some implementations, the SMAGCU broadcasts the "system ready" token, in other implementations it sends the "system ready" token via one or more serial transmissions.

Figure 13:
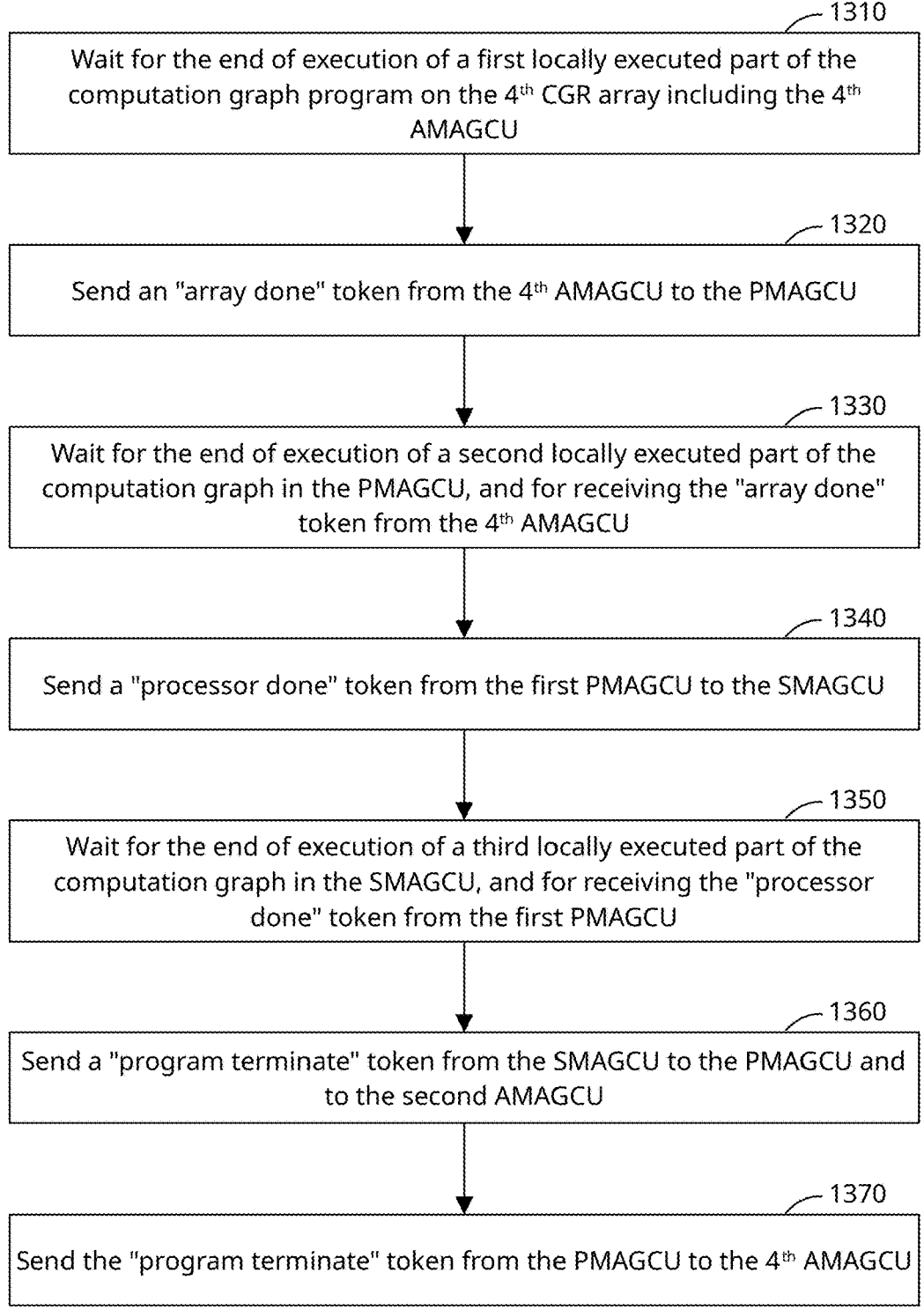
FIG. 13 illustrates an example method to hierarchically synchronize execution end in a system with multiple CGR processors.

FIG. 13 illustrates an example method 1300 to hierarchically synchronize execution end in a system with multiple CGR processors. The system may be similar to system 1000. Each CGR processor may include multiple CGR arrays. Each CGR array may include multiple AGCUs. For example, the system may comprise a first processor with a first physical CGR array (with an SMAGCU) and a second physical CGR array (with a second AMAGCU), and a second processor with a third physical CGR array (with a PMAGCU) and a fourth physical CGR array (with a fourth AMAGCU).

Method 1300 synchronizes execution termination of a computation graph or dataflow graph program that may involve part or all CGR arrays in a CGR processor, and part or all CGR processors in the system. Method 1300 includes the following steps.

Step 1310—waiting for the end of execution of a first locally executed part of the computation graph program on the fourth physical CGR array including a fourth AMAGCU. If the fourth physical CGR array executes multiple parts of the computation graph program, then the fourth AMAGCU determines if all parts of the computation graph program locally executed on the fourth physical CGR array have been fully executed.

Step 1320—sending an "array done" token from the fourth AMAGCU to the PMAGCU.

Step 1330—waiting for the end of execution of a second locally executed part of the computation graph in the PMAGCU, and for receiving the "array done" token from the fourth AMAGCU. If the third physical CGR array executes multiple parts of the computation graph program, then the PMAGCU determines if all parts of the computation graph program locally executed on the third physical CGR array have been fully executed.

Step 1340—sending a "processor done" token from the PMAGCU to the SMAGCU.

Step 1350—in the SMAGCU, waiting for the end of execution of a third locally executed part of the computation graph, waiting for receiving an "array done"

token from the second AMAGCU to indicate the end of execution of a fourth locally executed part of the computation graph, and waiting for receiving the "processor done" token from the PMAGCU.

Step 1360—sending a "program terminate" token from the SMAGCU to the PMAGCU and to the second AMAGCU.

Step 1370—sending the "program terminate" token from the PMAGCU to the fourth AMAGCU.

FIG. 14 illustrates another example method 1400 to synchronize execution end in a system with multiple CGR processors. This method does not assign a PMAGCU for each processor, but directly communicates between the SMAGCU and the AMAGCUs. The SMAGCU may broadcast its tokens, i.e., send them simultaneously to all AMAGCUs, or it may send the tokens via one or more serial transmissions. In such an implementation, the tokens may travel from AGCU to AGCU in a daisy-chain style. The implementation may save hardware circuits, but it may also be slower than other implementations. Method 1400 comprises:

Step 1410—for each physical CGR array mapped to a logical CGR array, waiting for the end of execution of a locally executed part of the computation graph program and sending an "array done" token from the physical CGR array's AMAGCU to the SMAGCU.

Step 1420—in the SMAGCU, waiting for having received the "array done" tokens from all AMAGCUs of the physical CGR arrays mapped to the logical array.

Step 1430—sending a "program terminate" token from the SMAGCU to all AMAGCUs, and terminating the program.

A method that combines all relevant steps of the technology described above, in a system including one or more CGR processors each including one or more physical CGR arrays that jointly execute a computation graph, comprises:

receiving the computation graph and partitioning the computation graph into partitions;

assigning the partitions to parts of a logical CGR array;

mapping the parts of the logical CGR array to at least a part of the physical CGR arrays;

designating one AGCU in each of the physical CGR arrays mapped to the partitions as an AMAGCU;

for each of the one or more CGR processors, designating one AGCU in a physical CGR array that is mapped to a partition as a PMAGCU;

for one of the physical CGR arrays that are mapped to partitions, designating one AGCU as an SMAGCU;

configuring the SMAGCU for performing a first part of actions in a synchronization protocol;

configuring each PMAGCU for performing a second part of actions in the synchronization protocol;

configuring each AMAGCU for performing a third part of actions in the synchronization protocol;

upon completion of configuring each AMAGCU, sending an "array ready" token from the AMAGCU to the PMAGCU;

upon completion of configuring each PMAGCU and receiving "array ready" tokens from AMAGCUs, sending a "processor ready" token from the PMAGCU to the SMAGCU;

upon completion of configuring the SMAGCU and receiving a "processor ready" token from each PMAGCU, broadcasting a "program start" token from the SMAGCU;

executing the computation graph in the one or more physical CGR arrays;

from AMAGCU, upon completion of a final task, sending a token "array done" to the PMAGCU;

from each PMAGCU, upon receiving "array done" tokens from all AMAGCUs in the same CGR processor, sending a token "processor done" to the SMAGCU; and in the SMAGCU, upon receiving "processor done" tokens from the PMAGCUs in the one or more CGR processors, broadcasting a "program terminate" token.

In implementations, the token protocol is implemented on top of an existing hardware infrastructure:

1. A TLN is used to transfer tokens from an AGCU to a network shim.
2. The sending network shim receives the token packet, and sends the token over the network to the target address.
3. The receiving network shim receives the packet, decodes it, and sends it over the TLN to the target AGCU.
4. The target AGCU receives the token over the TLN and enqueues it in a FIFO. The packet is held in the FIFO until the CGR array gets into execution state. Once the CGR array is in execution state, the FIFO in the AGCU is dequeued, the received packet is decoded as a token, and the token is transferred to the destination AGCU.

Considerations

The technology disclosed can be practiced as a system, or method. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods, and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, GPU, or in a programmable logic device such as a field-programmable gate array (FPGA), obviating a need for at least part of the dedicated hardware. Implementations may be as a single chip, or as a multi-chip module (MCM) packaging multiple semiconductor dies in a single package. All such variations and modifications are to be considered within the ambit of the present invention the nature of which is to be determined from the foregoing description.

Any suitable programming language can be used to implement the routines of particular implementations including C, C++, Java, JavaScript, compiled languages, interpreted languages and scripts, assembly language, machine language, etc. Different programming techniques can be employed such as procedural or object oriented. Methods embodied in routines can execute on a single processor device or on a multiple processor system. Although the steps, operations, or computations may be presented in a specific order, this order may be changed in different particular implementations. In some particular implementations, multiple steps shown as sequential in this specification can be performed at the same time.

Particular implementations may be implemented in a tangible, non-transitory computer-readable storage medium for use by or in connection with the instruction execution system, apparatus, board, or device. Particular implementations can be implemented in the form of control logic in software or hardware or a combination of both. The control logic, when executed by one or more processors, may be operable to perform that which is described in particular implementations. For example, a tangible non-transitory medium such as a hardware storage device can be used to store the control logic, which can include executable instructions.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A coarse-grained reconfigurable processor (a CGR processor) including one or more physical CGR arrays, wherein each physical CGR array includes an array of CGR units, an address generator and coalescing unit (AGCU), and a token interface, wherein:
    the token interface includes a bus interface, a token receive first-in-first-out memory (a token receive FIFO) coupled between the bus interface and the AGCU, and a token transmit FIFO coupled between the AGCU and the bus interface;
    the token interface is configured to communicate with another token interface via a token bus;
    the token interface is operable to receive tokens from the token bus and store received tokens in its token receive FIFO independent of a readiness of the array of CGR units and a readiness of the AGCU; and
    the AGCU is operable to:
        load and unload configuration data into and out of the array of CGR units;
        determine a configuration data load status and transmit a token including the configuration data load status via the token interface and the token bus;
        receive a program start token, and in response to receiving the program start token, start program execution in the array of CGR units; and
        receive a program termination token, and in response to receiving the program termination token, terminate program execution in the array of CGR units.

2. A system comprising at least a first CGR processor, wherein:
    the first CGR processor is configured with first configuration data that causes the first CGR processor to execute at least a first part of a computation graph included in at least a first part of a logical CGR array mapped to multiple physical CGR arrays, and to execute a synchronization protocol including actions to synchronize execution of the first part of the computation graph with execution of a second part of the computation graph; wherein:
        the synchronization protocol includes an execution start synchronization protocol and an execution termination synchronization protocol; and
        an AGCU of a first physical CGR array of the multiple physical CGR arrays mapped to the logical CGR array is configured with second configuration data to act as a system master AGCU (an SMAGCU) and to implement at least a first part of the execution start synchronization protocol and at least a first part of the execution termination synchronization protocol for the multiple physical CGR arrays.

3. The system of claim 2, wherein:
    an AGCU of a second physical CGR array of the multiple physical CGR arrays mapped to the logical CGR array is configured with third configuration data to act as an array master AGCU (an AMAGCU) and to implement a second part of the execution start synchronization protocol and a second part of the execution termination synchronization protocol for the multiple physical CGR arrays.

4. The system of claim 2, wherein the execution start synchronization protocol includes:
    sending, from the SMAGCU, a first token to the other physical CGR arrays of the multiple physical CGR arrays mapped to the logical CGR array to communicate a system master readiness;
    receiving, in the SMAGCU, a second token from each of the other physical CGR arrays of the multiple physical CGR arrays mapped to the logical CGR array, wherein the second token indicates a readiness of the other physical CGR array; and
    sending, from the SMAGCU, a third token to the other physical CGR arrays of the multiple physical CGR arrays mapped to the logical CGR array, wherein the third token includes a command to start executing the computation graph.

5. The system of claim 4, wherein:
    sending comprises broadcasting.

6. The system of claim 4, wherein:
    sending comprises transmitting serially through a daisy-chain.

7. The system of claim 2, wherein the execution termination synchronization protocol includes:
    receiving, in the SMAGCU, a fourth token from each of the other physical CGR arrays of the multiple physical CGR arrays mapped to the logical CGR array, wherein the fourth token indicates that the other physical CGR array has finished a final task; and broadcasting, from the SMAGCU, a fifth token to each of the other physical CGR arrays of the multiple physical CGR arrays mapped to the logical CGR array to terminate execution.

8. The system of claim 2, wherein:

an AGCU of a first physical CGR array mapped to the logical CGR array is configured with fourth configuration data to act as a system master AGCU (an SMACGU) and to implement a first part of the execution start synchronization protocol and a first part of the execution termination synchronization protocol for the multiple physical CGR arrays; and a second CGR processor is configured to execute a second part of the computation graph in a second part of the logical CGR array, wherein an AGCU of a sixth physical CGR array mapped to the logical CGR array is configured with fifth configuration data to act as a processor master AGCU (a PMAGCU) and to implement a second part of the execution start synchronization protocol and a second part of the execution termination synchronization protocol for the multiple physical CGR arrays.

9. The system of claim 2, wherein:

the first CGR processor includes at least a first physical CGR array and a second physical CGR array, both mapped to the logical CGR array, wherein an AGCU of the first physical CGR array is configured with sixth configuration data to act as SMAGCU and to implement a first part of the execution start synchronization protocol and a first part of the execution termination synchronization protocol for the multiple physical CGR arrays, and an AGCU of the second physical CGR array is configured with seventh configuration data to act as second AMAGCU and to implement a second part of the execution start synchronization protocol and a second part of the execution termination synchronization protocol for the multiple physical CGR arrays; and a second CGR processor includes at least a third physical CGR array and a fourth physical CGR array, both mapped to the logical CGR array, wherein an AGCU of the third physical CGR array is configured with eighth configuration data to act as PMAGCU and to implement a third part of the execution start synchronization protocol and a third part of the execution termination synchronization protocol for the multiple physical CGR arrays, and an AGCU of the fourth physical CGR array is configured with seventh configuration data to act as a fourth AMAGCU and to implement the second part of the execution start synchronization protocol and the second part of the execution termination synchronization protocol for the multiple physical CGR arrays.

10. The system of claim 9, wherein the execution start synchronization protocol comprises:

from the SMAGCU, sending a "system ready" token to the PMAGCU;

in the PMAGCU, receiving the "system ready" token from the SMAGCU and an "array ready" token from the fourth AMAGCU, and waiting for the third physical CGR array to be ready for execution;

from the PMAGCU, sending a "processor ready" token to the SMAGCU;

in the SMAGCU, receiving the "processor ready" token from the PMAGCU, receiving an "array ready" token from the second AMAGCU, and waiting for the first physical CGR array to be ready for execution; and from the SMAGCU, sending a "program start" token to the PMAGCU and the second AMAGCU.

11. The system of claim 9, wherein the execution termination synchronization protocol comprises:

in the PMAGCU, receiving an "array done" token from the fourth AMAGCU, and waiting for the third physical CGR array to finish a third final task;

from the PMAGCU, sending a "processor done" token to the SMAGCU;

in the SMAGCU, receiving the "processor done" token from the PMAGCU, receiving an "array done" token from the second AMAGCU, and waiting for the first physical CGR array to finish a first final task;

from the SMAGCU, sending a "program terminate" token to the PMAGCU and the second AMAGCU; and sending the "program terminate" token from the PMAGCU to the fourth AMAGCU.

12. The system of claim 2, wherein:

the first CGR processor includes at least a first physical CGR array and a second physical CGR array, both mapped to the logical CGR array, wherein an AGCU of the first physical CGR array is configured with sixth configuration data to act as SMAGCU and to implement a first part of the execution start synchronization protocol and a first part of the execution termination synchronization protocol for the multiple physical CGR arrays, and an AGCU of the second physical CGR array is configured with seventh configuration data to act as second AMAGCU and to implement a second part of the execution start synchronization protocol and a second part of the execution termination synchronization protocol for the multiple physical CGR arrays; and a second CGR processor includes at least a third physical CGR array and a fourth physical CGR array, both mapped to the logical CGR array, wherein an AGCU of the third physical CGR array is configured with ninth configuration data to act as aa third AMAGCU and to implement a third part of the execution start synchronization protocol and a third part of the execution termination synchronization protocol for the multiple physical CGR arrays, and an AGCU of the fourth physical CGR array is configured with seventh configuration data to act as a fourth AMAGCU and to implement the second part of the execution start synchronization protocol and the second part of the execution termination synchronization protocol for the multiple physical CGR arrays.

13. The system of claim 12, wherein the execution start synchronization protocol comprises:

sending a "system ready" token from the SMAGCU to the second AMAGCU, the third AMAGCU, and the fourth AMAGCU;

from each the second AMAGCU, the third AMAGCU, and the fourth AMAGCU, sending an "array ready" token to the SMAGCU; and upon receiving the "array ready" tokens from the second AMAGCU, the third AMAGCU, and the fourth AMAGCU, sending a "program start" token from the SMAGCU to the second AMAGCU, the third AMAGCU, and the fourth AMAGCU, and starting program execution.

14. The system of claim 12, wherein the execution termination synchronization protocol comprises:

for the second physical CGR array, the third physical CGR array, and the fourth physical CGR array, waiting for the end of execution of a locally executed part of the computation graph and sending an "array done" token from the second AMAGCU, the third AMAGCU, and the fourth AMAGCU to the SMAGCU;

in the SMAGCU, waiting for having received the "array done" tokens from the second AMAGCU, the third AMAGCU, and the fourth AMAGCU; and sending a "program terminate" token from the SMAGCU to the second AMAGCU, the third AMAGCU, and the fourth AMAGCU, and terminating execution of the computation graph.

15. A method for synchronizing a system including one or more CGR processors each including one or more physical CGR arrays that jointly execute a computation graph, comprising:

receiving the computation graph and partitioning the computation graph into partitions;

assigning the partitions to parts of a logical CGR array;

mapping the parts of the logical CGR array to at least a part of the one or more physical CGR arrays;

designating one AGCU in each of the one or more physical CGR arrays mapped to the partitions as an AMAGCU;

for each of the one or more CGR processors, designating one AGCU in a physical CGR array that is mapped to a partition as a PMAGCU;

for one of the one or more physical CGR arrays that are mapped to partitions, designating one AGCU as an SMAGCU;

configuring the SMAGCU for performing a first part of actions in a synchronization protocol;

configuring each PMAGCU for performing a second part of actions in the synchronization protocol;

configuring each AMAGCU for performing a third part of actions in the synchronization protocol;

upon completion of configuring each AMAGCU, sending an "array ready" token from the AMAGCU to the PMAGCU;

upon completion of configuring each PMAGCU and receiving "array ready" tokens from AMAGCUs, sending a "processor ready" token from the PMAGCU to the SMAGCU;

upon completion of configuring the SMAGCU and receiving a "processor ready" token from each PMAGCU, broadcasting a "program start" token from the SMAGCU;

executing the computation graph in the one or more physical CGR arrays;

from AMAGCU, upon completion of a final task, sending a token "array done" to the PMAGCU;

from each PMAGCU in one of the one or more CGR processors, upon receiving "array done" tokens from all AMAGCUs in the one of the one or more CGR processors, sending a token "processor done" to the SMAGCU; and in the SMAGCU, upon receiving a "processor done" token from each PMAGCU in the one or more CGR processors, broadcasting a "program terminate" token.

* * * * *